No. 743,550. Patented November 10, 1903.

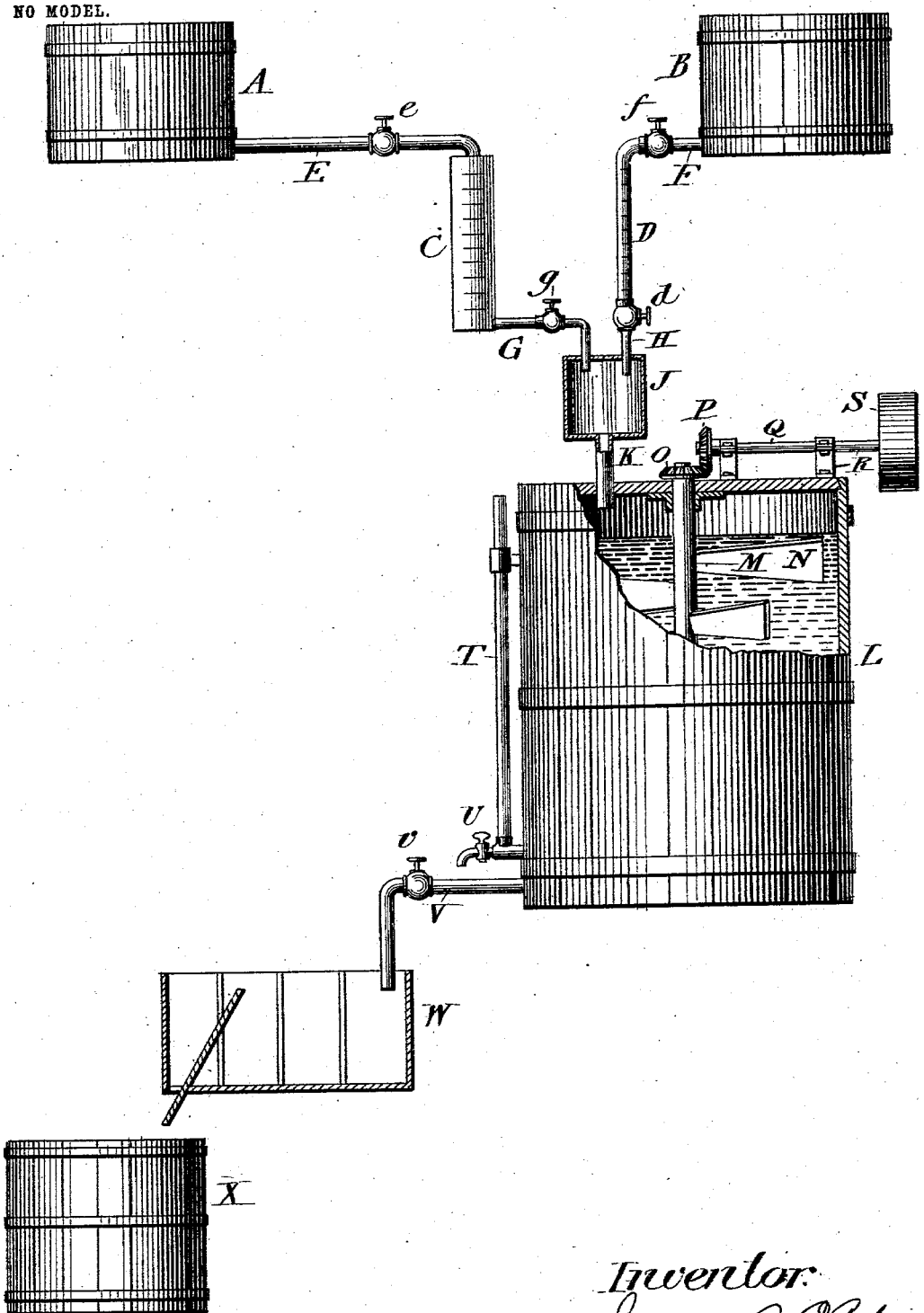

UNITED STATES PATENT OFFICE.

JAMES A. OGDEN, OF DEADWOOD, SOUTH DAKOTA, ASSIGNOR OF ONE-FOURTH TO S. W. RUSSELL, OF DEADWOOD, SOUTH DAKOTA.

PROCESS OF EXTRACTING METALS FROM CYANID SOLUTIONS.

SPECIFICATION forming part of Letters Patent No. 743,550, dated November 10, 1903.

Application filed August 6, 1902. Serial No. 118,656. (No specimens.)

*To all whom it may concern:*

Be it known that I, JAMES A. OGDEN, a citizen of the United States, residing at No. 8 Jefferson street, Deadwood, in the county of Lawrence and State of South Dakota, have invented certain new and useful Improvements in Processes of Extracting Metals from a Cyanid Solution of the Same; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to improvements in processes of extracting gold, silver, or other metals from a cyanid solution of the same; and it consists of mixing a cyanid solution containing metals with a metal, salts of a metal, or a compound of metals soluble in said cyanid solution in proper proportions, thoroughly agitating the mixture, and precipitating the same, as hereinafter set forth.

The drawing accompanying this specification and a part thereof represents an apparatus which may be employed in carrying out my invention.

In my improved process the amount of flow of the cyanid or primary solution, which is held in a tank A, may be controlled by means of a measuring-glass C, which is in communication with the tank A by means of the pipe E and cock e and is provided with a discharge-pipe G, having a cock g. The primary solution is mixed with a secondary or precipitating solution having a metallic base soluble in said primary solution, and the amount or proportion of said solutions is determined by the effect in the operation of the same. The secondary or precipitating solution consists of a metal—such as barium, magnesium, lead, or mercury—salts of a metal, or compound thereof soluble in a cyanid solution and is passed, as shown in the drawing, from its tank B through the pipe F into a measuring-glass D and then through the pipe H into a mixing vessel J, where it intermingles with the primary solution and a chemical reaction takes place, liberating the metals in the cyanid solution. The mixture is then passed into an agitating device, where it is thoroughly stirred or agitated, so as to hasten the chemical action by a complete intermingling of the two solutions. This device is shown in the drawing as a barrel or tank L, having a vertical shaft M, with blades N thereon and provided with connected shaft Q and gearing for rotating the said blades.

While the device named may be employed in the foregoing steps in the process, yet I do not wish to be restricted in my process to such apparatus, as other and suitable devices may be employed. However, those shown are preferred, and the same are shown, described, and claimed in a copending application.

After thoroughly agitating the mixed solution in the barrel L or other receptacle the solution is run into a settling-tank W and allowed to settle, when the clear solution is drawn off and the precipitates dried, pressed, and melted into bullion or the gold and silver separated by any well-known process before melting.

The clear solution may be fortified with a cyanid and reused.

By this process there is a shortening of the time in the precipitation of the metals and also a saving in the material over the old way of using zinc shavings or zinc flume.

Having thus described my invention, what I desire to claim and secure by Letters Patent is—

The process of treating gold, silver or other metals from a cyanid or primary solution, consisting in mixing in a receptacle a given quantity of said primary solution with a given quantity of a secondary solution having a metal base and capable of liberating the metals in said primary solution; leaving said mixture in said vessel until said liberation is partially effected, then passing said mixture into a second receptacle and agitated therein so as to produce a complete commingling of said solutions, from thence running the mixed solution into a settling-tank and allowing it to settle, drawing off the clear solution, and then drying the precipitation and pressing and melting it into bullion, substantially as described.

In testimony whereof I have affixed my signature in presence of two witnesses.

JAMES A. OGDEN.

Witnesses:
 RAY D. HUBBARD,
 MILTON L. BALDY.